(12) United States Patent
Zinn et al.

(10) Patent No.: US 7,404,152 B2
(45) Date of Patent: Jul. 22, 2008

(54) DISPLAYING MESSAGES ON HANDHELD DEVICES

(75) Inventors: Scotte Zinn, Waterloo (CA); David Yach, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 413 days.

(21) Appl. No.: 11/143,473

(22) Filed: Jun. 3, 2005

(65) Prior Publication Data

US 2006/0277504 A1 Dec. 7, 2006

(51) Int. Cl.
*G06F 3/14* (2006.01)
(52) U.S. Cl. .................... 715/864; 715/786; 715/787
(58) Field of Classification Search ............ 715/864, 715/786, 787
See application file for complete search history.

(56) References Cited

U.S. PATENT DOCUMENTS

| | | | |
|---|---|---|---|
| 2005/0004989 A1* | 1/2005 | Satterfield et al. | 709/206 |
| 2005/0037814 A1 | 2/2005 | Yasui et al. | |
| 2005/0120306 A1* | 6/2005 | Klassen et al. | 715/765 |

FOREIGN PATENT DOCUMENTS

| | | |
|---|---|---|
| EP | 1 246 483 | 10/2002 |
| WO | WO 02/069636 | 9/2002 |
| WO | WO 2004/008336 | 1/2004 |
| WO | WO 2005/043373 | 5/2005 |
| WO | WO 2005/045799 | 5/2005 |

OTHER PUBLICATIONS

Research In Motion Limited: "BlackBerry Wireless Handheld; Benutzerhandbuch", Online Manual, Nov. 7, 2003.

* cited by examiner

*Primary Examiner*—David Wiley
*Assistant Examiner*—Andrey Belousov
(74) *Attorney, Agent, or Firm*—Ridout & Maybee LLP

(57) ABSTRACT

A method of displaying messages on handheld devices. The device displays messages in a scrollable viewport of vertically arranged fields. Date separators inserted into the vertically arranged list of messages to enable the user to associate the messages with a date. The date separators have "sticky" operation, meaning that the device ensures a date separator always appears within the viewport, even when the viewport has been scrolled to the middle of a long list of messages all associated with the same date. The device may ensure that the top field of the viewport always contains a date separator associated with the message immediately below.

15 Claims, 4 Drawing Sheets

DISPLAYING MESSAGES ON HANDHELD DEVICES

FIELD OF THE APPLICATION

The present application relates to handheld devices and, in particular, to methods and systems for displaying messages on handheld devices.

BACKGROUND

Handheld electronic devices are commonly used to store and display messages. Devices that are enabled for wireless communication may also be used for sending and receiving messages. Where possible, the devices have been provided with messaging application having a user interface similar to the user interface found for similar application on a desktop computer. For example, an e-mail application may have a scrollable viewport for displaying messages in chronological order on the basis of the time and date on which they were received. The most recent messages are typically at the top. The user may then scroll through the list of messages to locate a particular desired message.

A handheld device typically has a limited display space due to its compact nature. This can result in some problems for displaying messages in a conventional format. For example, the limited display space may result in fewer messages appearing in the scrollable viewport. In some cases, the user can lose track of where he or she is in the list and may have difficulty identifying the date with which a particular message is associated.

Other features of handheld devices distinguish them from conventional desktop computers in terms of the ability to display and work with messages. For example, scrolling and selecting items on a handheld device may be more difficult since these devices typically do not includes a mouse. Therefore, simply scrolling on a handheld device may not be a desirable solution to the problem of losing track of the dates associated with messages in the viewport.

Accordingly, it would be advantageous to improve the display of messages on handheld devices.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

Figure 1:
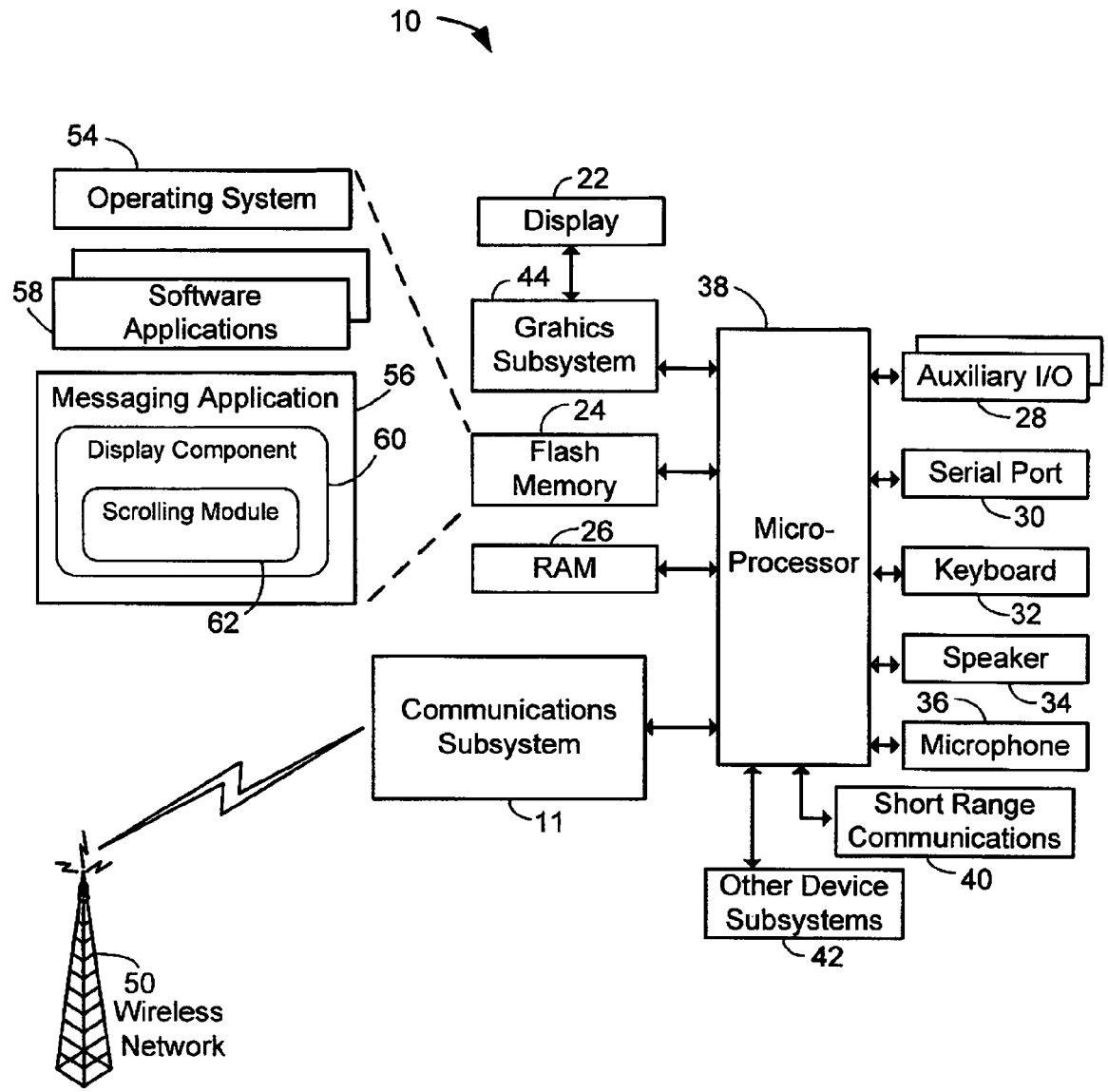
FIG. 1 shows a block diagram of a user device to which the present application is applied in an example embodiment.

The present application provides a method of displaying messages on handheld devices that improves the usability of the device. The method provides date separators inserted into a vertically arranged list of messages to enable the user to associate the messages with a date. The date separators have a "sticky" operation, meaning that the device ensures a date separator always appears within a viewport for viewing messages, even when the viewport has been scrolled to the middle of a long list of messages all associated with the same date. In one embodiment, the device ensures that the top field of the viewport always contains a date separator associated with the message immediately below.

In one aspect, the present application provides a method of displaying messages on a display of a handheld device. The display includes a scrollable viewport for displaying the messages. The viewport is divided into a plurality of fields arranged in a vertical list including a topmost field and a second field, the second field being immediately below the topmost field in the vertical list. The method includes the steps of identifying a top message for display in the second field, determining a date associated with the top message, and displaying a date separator item in the topmost field, wherein the date separator item is based upon the date associated with the top message.

In another aspect the present application provides a handheld electronic device having a messaging application for reading and composing messages. The device includes a display screen for displaying a scrollable viewport for displaying the messages. The viewport is divided into a plurality of fields arranged in a vertical list including a topmost field and a second field, the second field being immediately below the topmost field in the vertical list. The device also includes a processor connected to the display screen for controlling operation of the display screen. The device includes a scrolling module for controlling the display of messages and the operation of the scrollable viewport. The scrolling module includes a component for identifying a top message for display in the second field, a component for determining a date associated with the top message, and a component for displaying a date separator item in the topmost field, wherein the date separator item is based upon the date associated with the top message.

In yet a further aspect, the present application provides a computer program product having a computer-readable medium tangibly embodying computer executable instructions for displaying messages on a display of a handheld device. The display includes a scrollable viewport for displaying the messages. The viewport is divided into a plurality of fields arranged in a vertical list including a topmost field and a second field, the second field being immediately below the topmost field in the vertical list. The computer executable instructions includes computer executable instructions for identifying a top message for display in the second field, computer executable instructions for determining a date associated with the top message, and computer executable instructions for displaying a date separator item in the topmost field, wherein the date separator item is based upon the date associated with the top message.

Other aspects and features of the present application will be apparent to those of ordinary skill in the art from a review of the following detailed description when considered in conjunction with the drawings.

The following description of one or more specific embodiments does not limit the implementation to any particular computer programming language or system architecture. The present application is not limited to any particular operating system, mobile device architecture, or computer programming language. Moreover, although some of the embodiment described below include mobile devices, the present application is not limited to mobile devices; rather, it may be embodied within a variety of user devices or terminals, including handheld devices, mobile telephones, personal digital assistants (PDAs), personal computers, audio-visual terminals, televisions, and other devices. Any references herein to "messages" are not intended to be limited to e-mail, but should be understood to include many other kinds of messages, include text messages, audio messages, video messages, and other items, including calendar entries, tasks, and other date-related items.

Referring now to the drawings, FIG. 1 is a block diagram of an example embodiment of a user device. In the example embodiment, the user device is a two-way mobile communication device 10 having data and possibly also voice communication capabilities. In an example embodiment, the device 10 has the capability to communicate with other computer systems on the Internet. Depending on the functionality provided by the device 10, in various embodiments the device may be a data communication device, a multiple-mode communication device configured for both data-and voice communication, a mobile telephone, a PDA enabled for wireless communication, or a computer system with a wireless modem, among other things.

In this embodiment, the device 10 includes a communication subsystem 11. In one embodiment, the communication subsystem 11 may include a receiver, a transmitter, and associated components such as one or more, preferably embedded or internal, antenna elements, and a processing module such as a digital signal processor (DSP). As will be apparent to those skilled in the field of communications, the particular design of the communication subsystem 11 will be dependent upon the communication network in which the device 10 is intended to operate.

Signals received by the device 10 from a wireless communication network 50 are input to the receiver of the communication subsystem 11, which may perform such common receiver functions as signal amplification, frequency down conversion, filtering, channel selection and the like. In a similar manner, signals to be transmitted are processed, including modulation and encoding for example, by the DSP and input to the transmitter for digital to analog conversion, frequency up conversion, filtering, amplification and transmission over the wireless communication network 50.

The device 10 includes a microprocessor 38 that controls the overall operation of the device. The microprocessor 38 interacts with the communications subsystem 11 and also interacts with further device subsystems such as a graphics subsystem 44, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42. The graphics subsystem 44 interacts with the display 22 and renders graphics or text upon the display 22.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of software applications 58 which control basic device operations, including data and voice communication applications for example, will normally be installed on the device 10 during manufacture. Further software applications 58 may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22 through the graphics subsystem 44, or alternatively to an auxiliary I/O device 28. A user of device 10 may also compose data items within a software application 58, such as email messages for example, using the keyboard 32 in conjunction with the display 22 and possibly an auxiliary I/O device 28 such as, for example, a thumbwheel. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless mobile network 50 is, in an example embodiment, a wireless packet data network, (e.g. Mobitex™ or DataTAC™), which provides radio coverage to mobile devices 10. Wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

In one embodiment, the software resident on the device 10 includes a messaging application 56 for sending, receiving and displaying messages or other items, such as tasks, calendar items, etc. An example of a software application similar to the messaging application 56 is the Microsoft Outlook™ software application produced by the Microsoft Corporation. Note that the present application is not limited to use in association with e-mail messages and may apply to other messages, including SMS messages, and other "items", including calendar entries, task list entries, and other items having a date associated with them. References in the present application to "messages" or a "messaging application" should be understood to encompass and include this wider range of items.

The messaging application 56 includes a display component for displaying messages on the display 22 of the device 10 so that a user can read and sort through available messages. The display component defines a structure and format for displaying the available messages to the user and providing a user interface for selecting, opening, composing, and otherwise working with the messages.

In practice the number of messages available far exceeds the display capabilities of the device 10 in that not all messages may be displayed at once, even if only basic header information is displayed. This is especially the case on a handheld device which has a limited display screen as compared to a desktop or laptop personal computer. Accordingly, the display component includes a scrolling module 62 for determining the content displayed within a scrollable viewport. The scrollable viewport contains a vertically arranged list of messages that is a subset of the available messages. Using an input device, such as the keyboard 32 or a thumbwheel 28a (FIG. 2), the user can cause the displayed list within the viewport to scroll up or down. The implementation of a scrollable viewport and the use of the keyboard 32 or thumbwheel 28a to actuate a scrolling function is a well defined aspect of existing operating systems and will be well understood by one of ordinary skill in the art.

Figure 2:
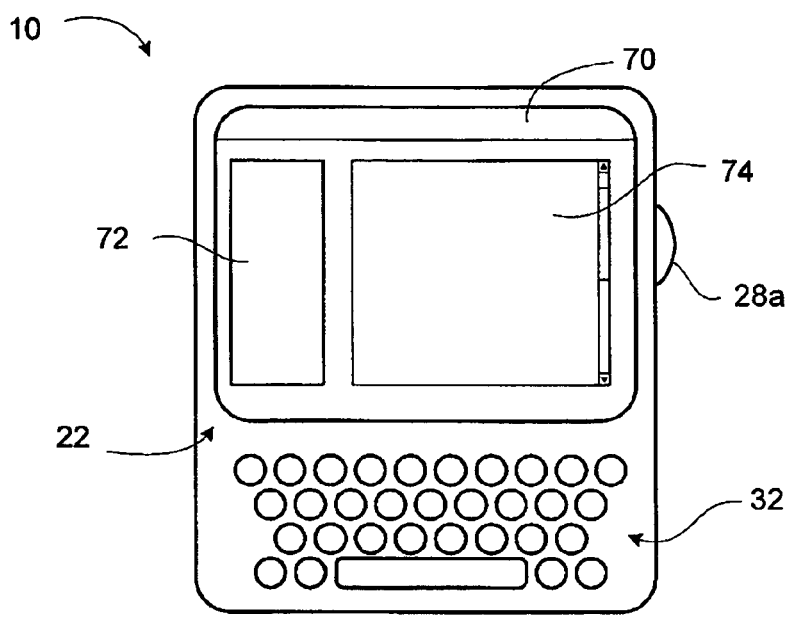
FIG. 2 shows, in diagrammatic form, a front view of an embodiment of the device from FIG. 1.

Reference is now made to FIG. 2, which shows, in diagrammatic form, a front view of an embodiment of the device 10 from FIG. 1. The device 10 includes the display 22, the keyboard 32 and the thumbwheel 28a.

The display 22 shows a graphical user interface for the messaging application 56 (FIG. 1). The user interface may include a tool bar 70, a folder list 72, and a scrollable message viewport 74. The folder list 72 may contain a list of selectable folders, such a calendar folder, a message inbox folder, a deleted items folder, etc. The user may select one of the available folders from the folder list 72. The contents of the selected folder are displayed in the scrollable message viewport 74.

Figure 3:
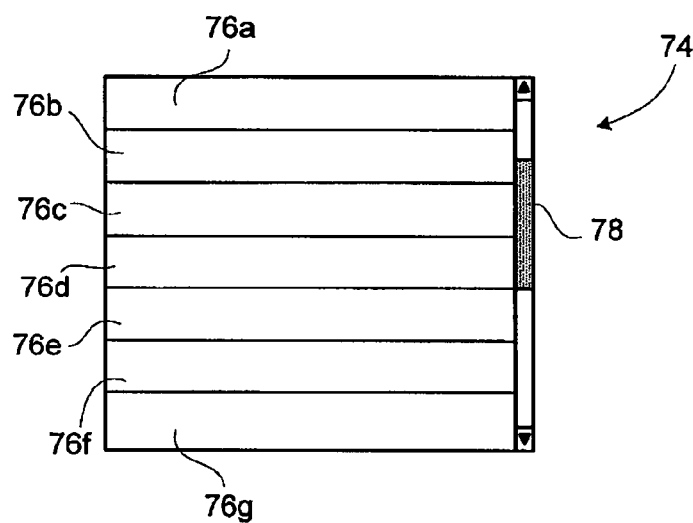
FIG. 3 shows a diagrammatic view of the scrollable message viewport from FIG. 2.

Referring now to FIG. 3, which shows the scrollable message viewport 74 from FIG. 2, it will be noted that the scrollable message viewport 74 is divided into a plurality of fields 76 arranged in a vertical list (numbered individually as 76a-76g). It may also include a scrollbar 78 for indicating the relative position of the viewport 74 in relation to the full vertical list of messages and providing a user interface for actuating a scrolling operation.

In the scrollable message viewport 74 associated with the messaging application 56 (FIG. 1) each of the fields 76 contains either a message item or a date separator item. Message items may include header information such as the sender of the message, the title of the message, and any associated markers, such an urgency indicator. Other information may be displayed in the field 76 with regard to the message item. In one embodiment, the field 76 shows the first few lines of the message content. In another embodiment, the time and date of the message is displayed. The message items appearing in the vertical list of messages are arranged in a chronological format based upon a date and time associated with each message item.

Figure 4:
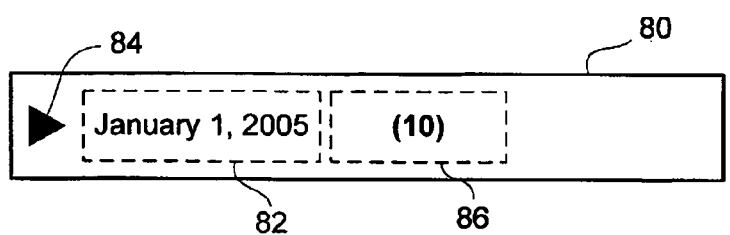
FIG. 4 shows, in diagrammatic form, an embodiment of a date separator item.

A date separator item is not a specific item but rather is delineator for indicating a particular date or range of dates associated with the messages that follow in the vertical list. Reference is now made to FIG. 4, which shows in diagrammatic form an embodiment of a date separator item 80. The date separator item 80 includes a date indicator 82. The date indicator 82 may be an absolute date (e.g. Jan. 1, 2005), a relative date (e.g. Today), or a relative or absolute range of dates (e.g. Last Week). When a date separator item 80 appears in the list of messages, all the messages following the date separator item 80 in the list are associated with the date indicator 82 until the next date separator item in the list is encountered—i.e. all the message items were received "Today" or "Last Week", as the case may be.

In this embodiment the date separator item 80 further includes an expansion indicator 84 and a message count indicator 86. The expansion indicator 84 graphically indicates whether the subsequent messages associated with the date indicator 82 are displayed in the list or are hidden. If the messages are displayed, then the expansion indicator 84 points downwards; and if they are hidden, then the expansion indicator 84 points to the side, as shown in FIG. 4. The user may selectively hide or display the messages associated with the date indicator 82.

The message count indicator 86 displays a message count associated with the date indicator 82. In one embodiment, the message count indicator 86 shows the number of message items associated with the date indicator 82. In another embodiment, the message count indicator 86 shows the number of unread message items associated with the date indicator 82. In yet another embodiment, the message count indicator 86 shows the number of unread message items associated with the date indicator 82 that have been received within a predetermined period of time, such as within the last hour. Other variations and combinations will be appreciated by those of ordinary skill in the art.

According to one aspect of the present application, the date separator item 80 is "sticky", meaning that it does not scroll out of the viewport 74 (FIG. 3) until a condition is met, for example if another date separator item scrolls into the viewport 74. In one embodiment, the "sticky" date separator item 80 holds its position at the topmost field 76a (FIG. 3) of the viewport 74 while message items are scrolled upwards until the next date separator item in the list is scrolled upwards and "pushes" the "sticky" date separator item 80 out of the topmost field 76a, whereupon the next date separator item becomes the "sticky" date separator item 80 at the top of the viewport 74. Similarly, when scrolling messages down into the viewport 74 a date separator item will remain in the topmost field 76a provided that the item in field 76b is associated with the date separator item. When the item scrolled into field 76b is associated with the "next" date, then the date separator item is bumped or scrolled down to field 76c and the topmost field 76a contains the next date separator item.

Referring again to FIG. 1, the scrolling module 62 determines the message items and date separator items to be displayed in the viewport 74 (FIG. 3). The scrolling module 62 enforces the conditions for maintaining the "sticky" date separator item 80 (FIG. 4) in the topmost field 76a (FIG. 3) of the viewport 74 while a user scrolls through messages. The scrolling module 62 determines when the conditions allow for the "sticky" date separator item 80 to scroll up out of the viewport 74 and/or be replaced with the next "sticky" date separator item 80.

Figure 5A:
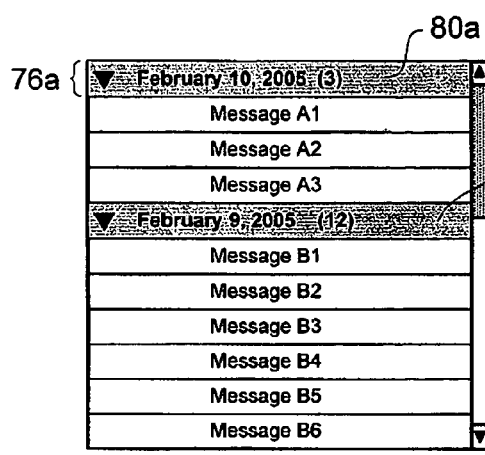
FIGS. 5(*a*)-5(*e*) show an example embodiment of a scrollable viewport to illustrate the "sticky" operation of date separator items.
Figure 5B:
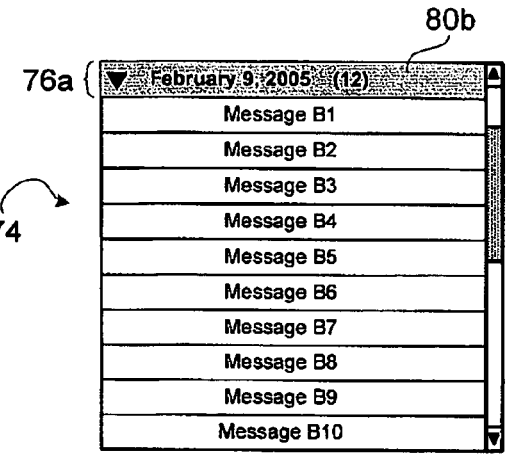

Reference is now made to FIGS. 5(a)-5(e), which diagrammatically show an example embodiment of the "sticky" operation of date separator items 80 (shown individually as 80a, 80b, 80c, and 80d). Each FIG. 5(a) to (e) shows the viewport 74 containing the list of fields 76, including the topmost field 76a.

in FIG. 5(a), the topmost field 76a contains the first date separator item 80a. The first date separator item 80a shows an absolute date reference of "Feb. 10, 2005" and a message count of three (3). It will be appreciated that the date reference and message count may be implemented in alternative ways, as described above, such as to show unread messages or relative date indicators. Following the first date separator item 80*a* in the list are three messages (A1-A3). The next item shown in the fields 76 of the viewport 74 is the second date separator item 80*b*, which displays a date reference of "Feb. 9, 2005" and a message count of twelve (12).

Figure 5:
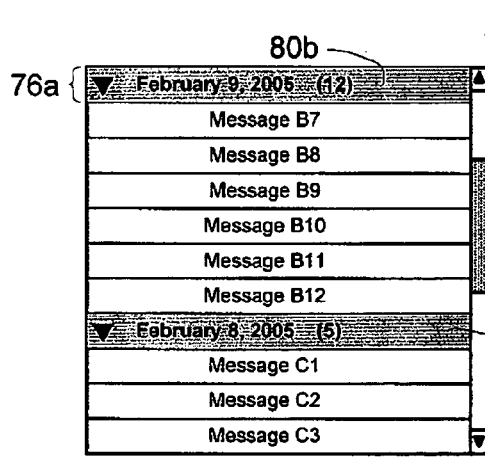
Figure 5D:
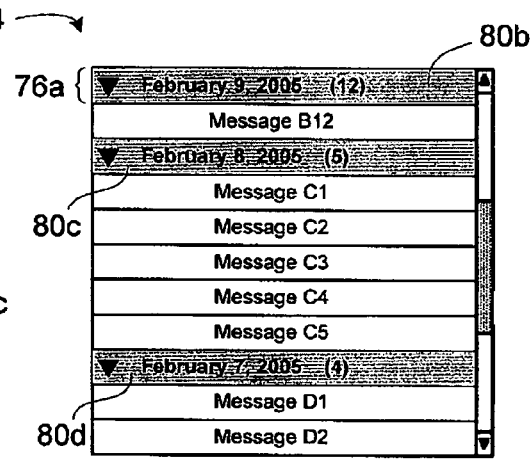
Figure 5:
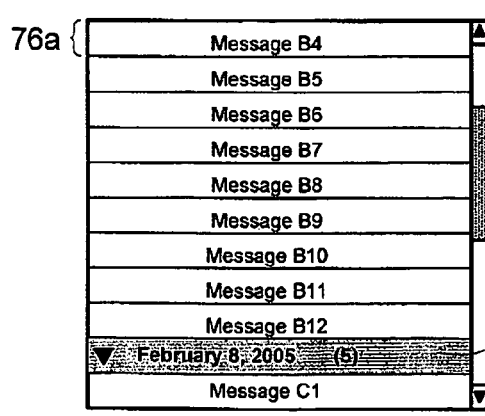
Figure 5E:
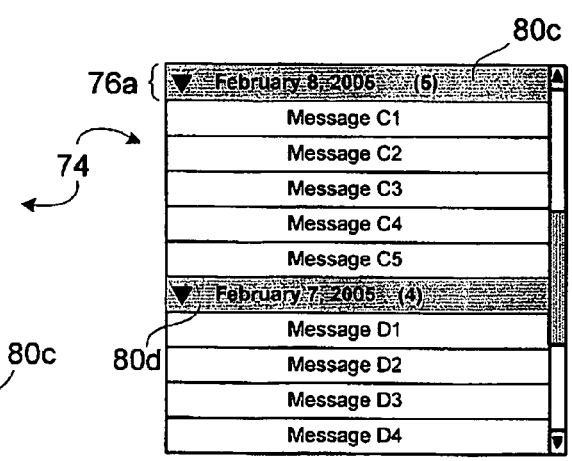

In FIG. 5(*b*), the user has scrolled downwards to the point where the topmost field 76*a* now contains the second date separator item 80*b*, which is then followed by messages B1-B10, which are associated with the second date separator item by virtue of a date (for example, date of receipt).

An embodiment of the "sticky" operation of the date separator items 80 is illustrated in FIG. 5(*c*1), which shows that as the user continues to scroll downwards the second date separator item 80*b* remains in the topmost field 76*a*, despite the fact that messages B1-B6 have scrolled up out of the viewport 74. As shown in FIG. 5(*d*), the second date separator item 80*b* remains in the topmost field 76*a* of the viewport 74 until the next, i.e., third date separator item 80*c* "pushes" it up out of the viewport 74, as shown in FIG. 5(*e*). Through this "sticky" operation of the date separator items 80, the user is always aware of the date (and message count, etc.) associated with the messages listed in the viewport 74, even when the number of messages for a particular date exceeds the display capacity of the viewport 74. In this embodiment, as downwards scrolling occurs each date separator item 80 is held in the topmost field 76*a* until it is "pushed" out, i.e. replaced, by the next date separator item 80 in the sequence. Accordingly, the topmost field 76*a* always contains a date separator item 80.

In another embodiment, as illustrated in FIG. 5(*c*2), the "sticky" operation of the date separator item 80 is dependent upon whether another date separator item is visible in the viewport 74. As shown in FIG. 5(*c*2), the third date separator item 80*c* has scrolled upwards into the viewport 74, so the second date separator item 80*b* need not be held in the topmost field 76. The rationale is that a user will be able to deduce the date associated with the messages above the third date separator item 80*c*. In this embodiment, the date separator item 80 is held in the topmost field 76*a* of the viewport 74 if another date separator item 80 has not yet scrolled into the viewport 74. In other words, there must always be at least one date separator item 80 visible in the viewport 74.

Although the foregoing description relates to scrolling down through a list, those of ordinary skill in the art will be able to appreciate that similar conditions may be imposed on the display of date separator items 80 to provide similar "sticky" operation for scrolling up a list.

Figure 6:
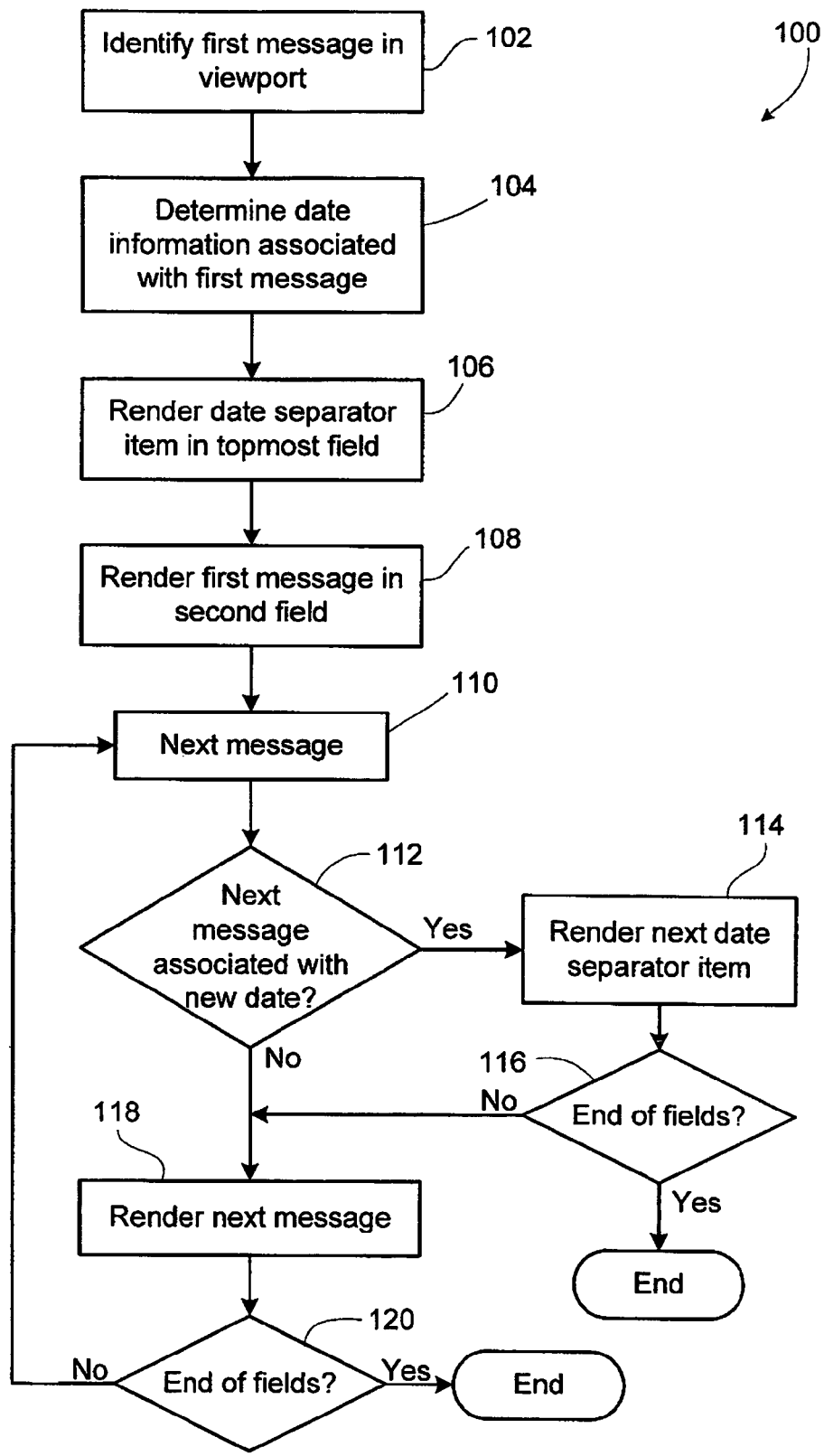
FIG. 6 shows, in flowchart form, an embodiment of a method for displaying messages on a handheld device.

Reference is now made to FIG. 6, which shows, in flowchart form, an embodiment of a method 100 for displaying messages on a handheld device. It will be appreciated that in this embodiment the "sticky" date separator item remains in the topmost field of the viewport until "pushed" out by a new date separator item.

The device includes a list of messages in chronological format. One of the messages is determined, in step 102, to be the first message displayed in the viewport. In an initial state, when first started, this may be the most recent message in the chronological list. In a later state of use, if the user has partially scrolled through the list then the message identified in step 102 as the first message in the viewport may be a message elsewhere on the list.

In step 104, the date associated with the first message is determined. Date and/or timestamp information may be stored with the message in memory. Based upon the date information identified in step 104, a date separator item is rendered in the topmost field of the viewport in step 106. The first message is then rendered in the next (i.e. second) field in the viewport in step 108. In step 110, the device looks at the next message in the list.

In step 112, the device determines if the next message corresponds to a new date. If the next message in the list is associated with a new date, i.e. a date different from the date associated with the previous message, then the method continues to step 114, wherein a new date separator item is rendered in the viewport in the field below the previous message. If the next message in the list is not associated with a new date, then the next message is rendered in the viewport in the field below the previous message. The method 100 thus continues to render messages and, where appropriate, date separator items, in the fields of the viewport until no further fields are available, as would be determined in steps 116 or 120.

It will be appreciated that if a user scrolls downwards or upwards, then the "first message" to be shown in the viewport, as determined in step 102, would change. The change to a new first message may necessitate a change in the date separator item shown in the topmost field if the new first message is associated with a different date than the previous first message. The appearance to the user will be of a "sticky" date separator item in the topmost field, while the other date separator items in the viewport will scroll with the scrolling messages.

In another embodiment, the messages may be stored in objects, wherein the objects each relate to a specific date. Accordingly all the messages within an object are associated with a certain date. The grouping of associated messages in an object permits operations to be performed on the group of messages by date. This data structure may facilitate implementation of the collapsing and expanding of messages under date separator headings. Suitable modifications to the method 100 described in FIG. 6 to accommodate such a data structure will be apparent to those of ordinary skill in the art.

The teachings of the present application may be embodied in other specific forms without departing from the spirit or essential characteristics thereof. Certain adaptations and modifications will be obvious to those skilled in the art. The above discussed embodiments are considered to be illustrative and not restrictive.

What is claimed is:

1. A method of displaying messages on a display of a handheld device, the display including a scrollable viewport for displaying the messages, each message having an associated date, a group of messages associated with a same associated date comprising a first associated message and other associated messages, the viewport being divided into a plurality of fields arranged in a vertical list including a topmost field and a second field, the second field being immediately below the topmost field in the vertical list, the method comprising the steps of:

identifying one of said other associated messages for display in the second field;

displaying a date separator item in said topmost field, wherein said date separator item is based upon said same associated date of said one of said other associated messages;

receiving a scroll command;

determining whether a next date separator item appears in any fields of the viewport other than said topmost field after scrolling is applied, and if so, displaying said one of said other associated messages in said topmost field in place of said date separator item, and if not, determining a date associated with a next message for display in the second field and displaying a new date separator item in said topmost field, wherein said new date separator item is based upon said date associated with said next message.

2. The method claimed in claim 1, wherein said date separator items each include a date indicator, and wherein the messages associated with each date separator item are associated with a date shown by the corresponding date indicator.

3. The method claimed in claim 2, wherein said date separator items each further include a message count indicator, said message count indicator being based upon messages associated with the corresponding date separator item.

4. The method claimed in claim 3, wherein said message count indicator is based upon unread messages received within a predetermined period of time.

5. A handheld electronic device having a messaging application for reading and composing messages, each message having an associated date, a group of messages associated with a same date comprising a first message and other associated messages, the device comprising:
 a display screen for displaying a scrollable viewport for displaying the messages, the viewport being divided into a plurality of fields arranged in a vertical list including a topmost field and a second field, the second field being immediately below the topmost field in the vertical list;
 an input device for receiving a scroll command from a user;
 a processor connected to the display screen for controlling operation of the display screen; and
 a scrolling module for controlling the display of messages and the operation of the scrollable viewport, the scrolling module including a component configured to identify one of said other associated messages for display in the second field, and a component configured to display a date separator item in said topmost field, wherein said date separator item is based upon said associated date of said one of said other associated messages,
 and wherein said scrolling module is configured to determine whether a next date separator item appears in any fields of the viewport other than said topmost field after scrolling is applied, and
  if so, display said one of said other associated messages in said topmost field in place of said date separator item, and
  if not, determine a date associated with a next message for display in the second field and display a new date separator item in said topmost field, wherein said new date separator item is based upon said date associated with said next message.

6. The device claimed in claim 5, wherein said date separator items each include a date indicator, and wherein the messages associated with each date separator item are associated with a date shown by the corresponding date indicator.

7. The device claimed in claim 6, wherein said date separator items each further include a message count indicator, said message count indicator being based upon messages associated with the corresponding date separator item.

8. The device claimed in claim 7, wherein said message count indicator is based upon unread messages received within a predetermined period of time.

9. A computer program product having a computer-readable medium tangibly embodying computer executable instructions for displaying messages on a display of a hand held device, the display including a scrollable viewport for displaying the messages, each message having an associated date, a group of messages associated with a same associated date comprising a first associated message and other associated messages, the viewport being divided into a plurality of fields arranged in a vertical list including a topmost field and a second field, the second field being immediately below the topmost field in the vertical list, the computer executable instructions comprising:
 computer executable instructions for identifying one of said other associated messages for display in the second field;
 computer executable instructions for displaying a date separator item in said topmost field, wherein said date separator item is based upon said same associated date of said one of said other associated messages;
 computer executable instructions for receiving a scroll command;
 computer executable instructions for determining whether a next date separator item appears in any fields of the viewport other than said topmost field after scrolling is applied, and
  if so, displaying said one of said other associated messages in said topmost field in place of said date separator item, and
  if not, determining a date associated with a next message for display in the second field and displaying a new date separator item in said topmost field, wherein said new date separator item is based upon said date associated with said next message.

10. The computer program product claimed in claim 9, wherein said date separator items each include a date indicator, and wherein the messages associated with each date separator item are associated with a date shown by the corresponding date indicator.

11. The computer program product claimed in claim 10, wherein said date separator items each further include a message count indicator, said message count indicator being based upon messages associated with the corresponding date separator item, and wherein said message count indicator is based upon unread messages received within a predetermined period of time.

12. A method of displaying messages on a display of a handheld device, the display including a scrollable viewport for displaying the messages, each message having an associated date, a group of messages associated with a same associated date comprising a first associated message and other associated messages, the viewport being divided into a plurality of fields arranged in a vertical list including a topmost field and a second field, the second field being immediately below the topmost field in the vertical list, the method comprising the steps of:
 identifying one of said other associated messages for display in the second field;
 displaying a date separator item in said topmost field, wherein said date separator item is based upon said same associated date of said one of said other associated messages;
 receiving a scroll command;
 identifying a next message for display in the second field after scrolling is applied and determining whether the next message is associated with the same associated date as the date separator item, and
  if so, maintaining display of the date separator item in the topmost field, and
  if not, displaying a new date separator item in said topmost field, wherein said new date separator item is based upon a date associated with said next message.

13. The method claimed in claim 12, wherein the group of messages associated with the same date includes a last message and wherein the one of said other associated messages in the second field prior to receipt of the scroll command is the last message, and wherein the next message is a first message in a subsequent group of messages.

14. A handheld electronic device having a messaging application for reading and composing messages, each message having an associated date, a group of messages associated with a same date comprising a first message and other associated messages, the device comprising:
- a display screen for displaying a scrollable viewport for displaying the messages, the viewport being divided into a plurality of fields arranged in a vertical list including a topmost field and a second field, the second field being immediately below the topmost field in the vertical list;
- an input device for receiving a scroll command from a user;
- a processor connected to the display screen for controlling operation of the display screen; and
- a scrolling module for controlling the display of messages and the operation of the scrollable viewport, the scrolling module including a component configured to identify one of said other associated messages for display in the second field, and a component configured to display a date separator item in said topmost field, wherein said date separator item is based upon said associated date of said one of said other associated messages,
- and wherein said scrolling module is configured to identify a next message for display in the second field after scrolling is applied and configured to determine whether the next message is associated with the same associated date as the date separator item, and
  - if so, maintain display of the date separator item in the topmost field, and
  - if not, display a new date separator item in said topmost field, wherein said new date separator item is based upon a date associated with said next message.

15. The device claimed in claim 14, wherein the group of messages associated with the same date includes a last message and wherein the one of said other associated messages in the second field prior to receipt of the scroll command is the last message, and wherein the next message is a first message in a subsequent group of messages.

* * * * *